(12) United States Patent
Gorodetzer

(10) Patent No.: US 11,849,885 B2
(45) Date of Patent: Dec. 26, 2023

(54) BEARING HERB GRINDER

(71) Applicant: Amit Gorodetzer, Mt. Pleasant, SC (US)

(72) Inventor: Amit Gorodetzer, Mt. Pleasant, SC (US)

(*) Notice: Subject to any disclaimer, the term of this patent is extended or adjusted under 35 U.S.C. 154(b) by 132 days.

(21) Appl. No.: 16/751,292

(22) Filed: Jan. 24, 2020

(65) Prior Publication Data
US 2020/0237158 A1    Jul. 30, 2020

Related U.S. Application Data

(60) Provisional application No. 62/797,015, filed on Jan. 25, 2019.

(51) Int. Cl.
*A47J 42/34* (2006.01)
*A47J 42/38* (2006.01)

(52) U.S. Cl.
CPC .............. *A47J 42/34* (2013.01); *A47J 42/38* (2013.01)

(58) Field of Classification Search
CPC .. A47J 42/34; A47J 42/38; A47J 42/00; A47J 42/04; A47J 42/12; A47J 42/14; A47J 42/24; A47J 42/30; A47J 42/32; A47J 43/25; A47J 43/30
USPC ................... 241/168, 169.2, 273.3
See application file for complete search history.

(56) References Cited

U.S. PATENT DOCUMENTS

| | | | | |
|---|---|---|---|---|
| 5,260,657 A | * | 11/1993 | Lewis | G01R 33/307 324/307 |
| 5,685,501 A | * | 11/1997 | Wagner | A47J 43/255 241/273.3 |
| 7,422,170 B2 | | 9/2008 | Bao | |
| 7,886,999 B2 | * | 2/2011 | Ruzycky | A47J 19/06 241/168 |
| 8,083,167 B1 | | 12/2011 | Namakian et al. | |
| 8,235,233 B2 | * | 8/2012 | Pehr | B65D 55/14 215/237 |
| 8,695,906 B2 | | 4/2014 | Hainbach | |
| 8,733,679 B2 | | 5/2014 | Camitta | |
| 9,198,541 B2 | * | 12/2015 | Smith | A47J 43/25 |
| 9,757,733 B1 | * | 9/2017 | Dukat | A47J 42/40 |
| 9,943,104 B1 | | 4/2018 | Simon | |
| 10,039,418 B2 | | 8/2018 | Staiano et al. | |
| 2015/0157167 A1 | * | 6/2015 | Eicher | A47J 42/10 99/286 |
| 2016/0045071 A1 | * | 2/2016 | Sahli | A47J 42/20 241/261.2 |

(Continued)

FOREIGN PATENT DOCUMENTS

| | | | | |
|---|---|---|---|---|
| GB | 2557950 A | * | 7/2018 | ............. A47J 42/34 |
| WO | WO-2004037057 A1 | * | 5/2004 | ............. A47J 42/08 |

OTHER PUBLICATIONS

WO 2004 037057 MT (Year: 2004).*

(Continued)

*Primary Examiner* — Adam J Eiseman
*Assistant Examiner* — Fred C Hammers
(74) *Attorney, Agent, or Firm* — Thrive IP®; Jeremy M. Stipkala

(57) ABSTRACT

A grinder comprises a bearing track and a plurality of bearing elements such as ball bearings or roller bearings. Optionally, the bearing elements are protected from fouling or contamination from the material being ground, which can be, for example, herbs, spices, tobacco, or cannabis.

17 Claims, 14 Drawing Sheets

(56) References Cited

U.S. PATENT DOCUMENTS

2016/0318029 A1* 11/2016 Lin .................... A47J 42/38
2017/0135524 A1* 5/2017 Moneta ............... B02C 23/10
2018/0049591 A1* 2/2018 Biernatek ............ A47J 42/04
2018/0126386 A1* 5/2018 Witko ................. B02C 18/16

OTHER PUBLICATIONS

"Introducing the #SantaCruz Mega Shredder for Dispensaries!" @santacruzcup, Jan. 26, 2016 (available at: https://www.picbear.org/media/BBBOiLzGGel).
"Shred-Tek Herb Grinder," IndieGoGo, 2016 (available at: https://www.indiegogo.com/projects/shred-tek-herb-grinder#/).

* cited by examiner

© 2020 Amit Gorodetzer

© 2020 Amit Gorodetzer

© 2020 Amit Gorodetzer

© 2020 Amit Gorodetzer

BEARING HERB GRINDER

RELATED APPLICATIONS

This application claims benefit of priority under 35 U.S.C. § 119(e) of U.S. Provisional Application No. 62/797,015, entitled "BEARING HERB GRINDER," filed on Jan. 25, 2019, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates to grinding machines suitable for grinding fibrous material, and accessories.

BACKGROUND OF THE INVENTION

Grinders suitable for reducing herbs, spices, tobacco, and cannabis are known. Those devices typically rely on the rotation of one portion of the grinder against another portion, thereby causing grinding teeth to move past each other to shred the material being ground. Often, the rotating portions must be pressed together to keep the grinding teeth engaged. The pressure that keeps the grinding teeth engaged necessarily increases the friction, both static and dynamic, between the portions of the grinder that rotate against each other. That friction has been addressed by providing contact surfaces of those portions that are as smooth as possible. However, that solution is inadequate. Mechanisms for reducing friction between the portions of the grinder are needed.

SUMMARY OF THE INVENTION

Unexpectedly, Applicant has invented new devices and methods that overcome problems found in grinders that have come before. In some cases, a grinder according to the present invention exhibits reduce friction between the portions of a grinder that rotate against each other. In other cases, a grinder having reduced friction has protection against fouling by the material being ground. In still other cases, improved methods for grinding material have been invented. Yet additional cases provide methods for making inventive grinders.

Some embodiments of the present invention provide a grinder, comprising a base having a first plurality of grinding teeth for grinding a fibrous substance, and a lower bearing track encircling the first plurality of grinding teeth; a plurality of bearing elements disposed in the lower bearing track; an upper bearing track in rotational contact with the plurality of bearing elements; and a grinding cap comprising a second plurality of grinding teeth for grinding the fibrous substance, the grinding cap being adapted to contact the upper bearing track so that the grinding cap can be rotated relative to the base wherein the lower bearing track, the plurality of bearing elements, and the upper bearing track reduce friction between the grinding cap and the base.

Further embodiments relate to methods of grinding a fibrous substance, one such method comprising: obtaining a grinder as described herein; placing the fibrous substance between the first plurality of grinding teeth and the second plurality of grinding teeth; rotating the grinding cap relative to the base, thereby causing the first plurality of grinding teeth and the second plurality of grinding teeth to grind the fibrous substance.

Other embodiments of the present invention involve methods of manufacturing the inventive grinders disclosed herein, one such method comprising obtaining the base having the first plurality of grinding teeth and the lower bearing track encircling the first plurality of grinding teeth; disposing the plurality of bearing elements in the lower bearing track; placing the upper bearing track in rotational contact with the plurality of bearing elements; and obtaining the grinding cap comprising the second plurality of grinding teeth; thereby forming the grinder.

Still other embodiments provide containers, one such container comprising a bottom comprising a first plurality of container magnets; a top comprising a second plurality of container magnets; wherein the first plurality of container magnets and second plurality of container magnets align when the bottom is in a closed position relative to the top.

Still further embodiments provide grinders such as one comprising a base having a first plurality of grinding teeth for grinding a fibrous substance, and a lower bearing track encircling the first plurality of grinding teeth; an upper bearing track; a plurality of bearing elements disposed in the upper bearing track, wherein the upper bearing track and the plurality of bearing elements are disposed in rotational contact with the lower bearing track; a grinding cap comprising a second plurality of grinding teeth for grinding the fibrous substance, the grinding cap being adapted to contact the upper bearing track so that the grinding cap can be rotated relative to the base wherein the lower bearing track, the plurality of bearing elements, and the upper bearing track reduce friction between the grinding cap and the base.

Broadly, additional embodiments relate to methods of reducing rotational friction between a first surface and a second surface that rotate against each other in a contaminating environment, one such method comprising interposing a bearing race between the first surface and the second surface, wherein the bearing race comprises a plurality of bearing elements in rotational contact with a first bearing track and a second bearing track, and wherein the first bearing track and second bearing track shield the plurality of bearing elements from contamination from the contaminating environment, thereby reducing rotational friction between the first surface and the second surface.

Yet additional embodiments relate to methods of sealing a bearing race, one such method comprising:
providing a bearing race having a first bearing track, a second bearing track, and a plurality of bearing elements between the first bearing track and the second bearing track; establishing an inner bearing seal and an outer bearing seal on the first bearing track to seal the plurality of bearing elements.

Still other embodiments of the present invention relate to herb collection tools, useful for obtaining the material from the grinder or from a container. One such herb collection tool comprises a guide channel having an attaching support, the attaching support adapted to attach the herb collection tool to an herb grinder or an herb container.

While the disclosure provides certain specific embodiments, the invention is not limited to those embodiments. A person of ordinary skill will appreciate from the description herein that modifications can be made to the described embodiments and therefore that the specification is broader in scope than the described embodiments. All examples are therefore non-limiting.

BRIEF DESCRIPTION OF THE DRAWINGS

FIGS. 23-24 add first container 210. FIG. 25 shows herb collection tool 500 attached to first container 210 in a cutaway view.

DETAILED DESCRIPTION

Figure 1:
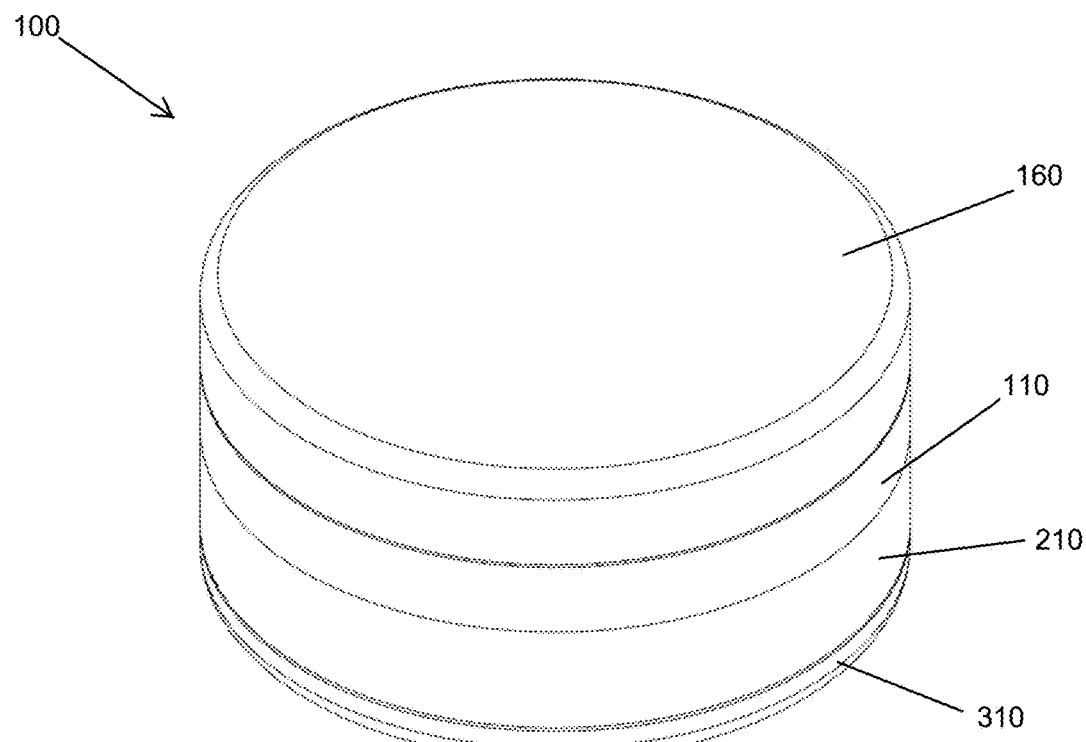
FIGS. 1-2 depict one embodiment of the invention comprising grinder 100 in a perspective view.

As required, detailed embodiments of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Unless defined otherwise, all technical and scientific terms used herein have the same meaning as is commonly understood by one of ordinary skill in the art to which this disclosure belongs. In the event that there is a plurality of definitions for a term herein, those in this disclosure prevail unless stated otherwise.

Wherever the phrase "for example," "such as," "including" and the like are used herein, the phrase "and without limitation" is understood to follow unless explicitly stated otherwise. Similarly, "an example," "exemplary" and the like are understood to be non-limiting.

The term "substantially" allows for deviations from the descriptor that don't negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

As mentioned above, some embodiments of the present invention provide a grinder comprising a base having a first plurality of grinding teeth for grinding a fibrous substance. As can be appreciated by one of ordinary skill in the art, the base can be any suitable shape. In some cases, it is adapted to be held in a person's hand while the grinding operation occurs. That base may have a lower bearing track encircling the first plurality of grinding teeth. That allows a plurality of bearing elements to be disposed or housed in the lower bearing track. The grinder may also contain an upper bearing track in rotational contact with the plurality of bearing elements. In certain instances, the upper bearing track keeps the plurality of bearing elements contained within the lower bearing track. Further, the upper bearing track rotates over the bearing elements relative to the lower bearing track and the base. The grinder also has a grinding cap comprising a second plurality of grinding teeth for grinding the fibrous substance. The pluralities of grinding teeth are arranged in any suitable geometry. In some embodiments, the grinding teeth describe an unobstructed circular path so the base and the grinding cap can freely rotate relative to each other. In other embodiments, the grinding teeth describe an arcuate path, not necessarily a complete circle. The grinding cap is adapted to contact the upper bearing track in certain instances so that the grinding cap can be rotated relative to the base, and the lower bearing track, the plurality of bearing elements, and the upper bearing track reduce friction between the grinding cap and the base. Friction is reduced, in some instances, relative to known grinders where portions of the grinders contact and rotate against each other. The present invention, in certain embodiments, imposes a bearing race comprising a lower bearing track, an upper bearing track, and a plurality of bearing elements disposed therein to reduce the static and dynamic friction between those portions.

In some cases, one or more bearing seals protect the bearing elements from fouling or contamination. For example, some grinders of the present invention contain an inner bearing seal proximal to the upper bearing track and adapted to reduce contact between the fibrous substance and the plurality of bearing elements. As used herein, "inner" and "outer" describe location relative to the grinding teeth. An inner bearing seal is closer to the grinding teeth; an outer bearing seal is further from the grinding teeth. Accordingly, a grinder may further comprise an outer bearing seal proximal to the upper bearing track and adapted to reduce contact between the fibrous substance and the plurality of bearing elements.

Any suitable bearing elements can be used in the various embodiments of the present invention. Those bearing elements may be, for example, ball bearings, right cylindrical bearings, conical bearings, truncated conical bearings, or a combination of two or more thereof. Furthermore, they may be made of any suitable material, such as, for example, metals such as aluminum, steel, stainless steel, or any suitable alloy; glass; ceramic; polymer; polished stone; wood; and combinations thereof. Optionally, the bearing elements can be accompanied by one or more lubricants, such as, for example, graphite, silicon dioxide powder, grease, oil, or combinations thereof. Or, the bearing elements can function without any lubricant.

It can be advantageous in certain instances to keep the grinder "closed." Thus, some grinders include an upper bearing track comprising an upper lock structure, and a lower bearing track comprising a lower lock structure, wherein the upper lock structure engages the lower lock structure to keep the upper bearing track in rotational contact with the plurality of bearing elements disposed in the lower bearing track. Other grinders include one or more magnets disposed between the base and the grinding cap to connect the grinding cap to the base when the grinder is not in use.

Some grinders further comprise a container for storing ground or unground material. Accordingly, some grinders include a first container adapted to attach to the base opposite the grinding cap. The container can be separate from the grinder, meaning material cannot pass from the grinder to the container. Or, in certain instances, the base of the grinder may comprise a plurality of base openings adapted to allow the fibrous substance to pass through the base to the first container as the fibrous substance is ground. Base openings can have the same or differing sizes, and the same or different shapes. Circles, squares, rectangles, star-shapes, triangles, polygons, leaf shapes, and the like, singly or in combinations, may be mentioned. Any suitable sizes can be used for base openings. For example, base openings can have a dimension such as diameter of less than about 0.100", less than about 0.200", less than about 0.300", less than about 0.400", or less than about 0.500". For another example, base openings can have a dimension such as diameter of at least about 0.100", at least about 0.200", at least about 0.300", at least about 0.400", or at least about 0.500".

Containers can attach to the grinder in any suitable manner. For example, the first container can be adapted to attach to the base with at least one first connection mechanism chosen from a locking flange, a container magnet, and a threaded interface, and combinations thereof. If desired, a locking flange comprises a rotational stop. That allows rotation of the container relative to the grinder to come to a full stop, and provides security against the container opening inadvertently. If desired, more than one container can attach to a grinder of the present invention. For example, in some cases, a grinder includes a second container adapted to attach to the first container opposite the base. The additional containers can be separate from other containers, or they can be adapted to allow material to pass from the grinder or another container. For example, a grinder comprising two containers can further include a mesh screen disposed between the first container and the second container. Any suitable mesh size can be employed. For example, the mesh screen can be describes as having a mesh size of less than about 100 µm, less than about 150 µm, less than about 150 µm, less than about 200 µm, less than about 250 µm, less than about 300 µm, less than about 350 µm, less than about 400 µm, less than about 450 µm, less than about 500 µm, less than about 550 µm, less than about 600 µm, less than about 650 µm, less than about 700 µm, less than about 75 µm, less than about 800 µm, less than about 850 µm, less than about 900 µm, less than about 950 µm, or less than about 1000 µm. For another example, the mesh screen can be describes as having a mesh size of at least about 100 µm, at least about 150 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 75 µm, at least about 800 µm, at least about 850 µm, at least about 900 µm, at least about 950 µm, or at least about 1000 µm. Moreover, the second container can be adapted to attach to the first container, for example. Any suitable connection mechanism can be employed. In some cases, a second connection mechanism is chosen from a locking flange, a container magnet, and a threaded interface, and combinations thereof.

Any suitable materials can be used to form the grinders and the components thereof of the present invention. For example, stainless steel, aluminum, polymer, stone, wood, or a combination of two or more thereof may appear.

As described herein, applicant has invented methods of grinding a fibrous substance. Any suitable fibrous substance may be ground in one or more of the various grinders described herein. Among fibrous substances, herbs, spices, tobacco, and cannabis may be mentioned. One such method of grinding involves obtaining a grinder as described herein; placing the fibrous substance between the first plurality of grinding teeth and the second plurality of grinding teeth; and rotating the grinding cap relative to the base, thereby causing the first plurality of grinding teeth and the second plurality of grinding teeth to grind the fibrous substance.

Applicant has also developed methods of manufacturing grinders and the components thereof. One such method includes obtaining the base having the first plurality of grinding teeth and the lower bearing track encircling the first plurality of grinding teeth; disposing the plurality of bearing elements in the lower bearing track; placing the upper bearing track in rotational contact with the plurality of bearing elements; and obtaining the grinding cap comprising the second plurality of grinding teeth; thereby forming the grinder.

Applicant has also invented certain containers. One such container includes a bottom comprising a first plurality of container magnets; a top comprising a second plurality of container magnets; wherein the first plurality of container magnets and second plurality of container magnets align when the bottom is in a closed position relative to the top. Magnets align when there opposite poles are in close proximity manifesting an attractive force between them. Such containers may also include a locking flange that locks when the bottom is in the closed position relative to the top. The locking flange may include any desirable structure. In some cases, the container comprises a plurality of locking flanges disposed on the bottom, and a plurality of grooves on the top adapted to receive the plurality of locking flanges. In other cases, the container comprises a plurality of locking flanges disposed on the top, and a plurality of grooves on the bottom adapted to receive the plurality of locking flanges. In still other cases, the container comprises one or more first locking flanges disposed on the top and one or more first grooves disposed on the bottom and adapted to receive the one or more first locking flanges; one or more second locking flanges disposed on the bottom and one or more second grooves disposed on the top and adapted to receive the one or more second locking flanges. In still other cases, it can be said that two locking flanges interact with each other to secure two components together.

As mentioned herein, applicant has invented certain grinders, one such grinder includes a base having a first plurality of grinding teeth for grinding a fibrous substance, and a lower bearing track encircling the first plurality of grinding teeth; an upper bearing track; a plurality of bearing elements disposed in the upper bearing track, wherein the upper bearing track and the plurality of bearing elements are disposed in rotational contact with the lower bearing track; a grinding cap comprising a second plurality of grinding teeth for grinding the fibrous substance, the grinding cap being adapted to contact the upper bearing track so that the grinding cap can be rotated relative to the base wherein the lower bearing track, the plurality of bearing elements, and the upper bearing track reduce friction between the grinding cap and the base.

Yet additional grinders affix the upper bearing track to the grinding cap, while the lower bearing track remains affixed to the base. Bearing elements can be disposed in the upper bearing track, the lower bearing track, or both. See, e.g., FIG. 28 for plural ranks of bearing elements. Still other grinders affix the upper bearing track to the grinding cap, and the lower bearing track is in rotational contact with the plurality of bearing elements but is not affixed to the base. Yet other grinders feature a bearing race positioned between, but not affixed to, the grinding cap and the base.

Still other inventive methods relate to methods of reducing rotational friction between a first surface and a second surface that rotate against each other in a contaminating environment, one such method comprising: interposing a bearing race between the first surface and the second surface, wherein the bearing race comprises a plurality of bearing elements in rotational contact with a first bearing track and a second bearing track, and wherein the first bearing track and second bearing track shield the plurality of bearing elements from contamination from the contaminating environment, thereby reducing rotational friction between the first surface and the second surface. In some cases, the first bearing track is affixed to the first surface. In further cases, the second bearing track is affixed to the second surface. The plurality of bearing elements can be disposed in the first bearing track, the second bearing track, or both.

Methods of sealing a bearing race have also been invented. As used herein, "seal" and "sealing" indicate protecting bearing elements from contamination or fouling from the material being ground. The seal need not be hermetic or fluid-proof, but it can be in certain instances. One such method includes providing a bearing race having a first bearing track, a second bearing track, and a plurality of bearing elements between the first bearing track and the second bearing track; and establishing an inner bearing seal and an outer bearing seal on the first bearing track to seal the plurality of bearing elements. Optionally, a single bearing seal, such as an inner bearing seal, can be employed in certain examples of the present invention. Further, one or more bearing seals can appear on the second bearing track as well.

Applicant has also invented herb collection tools. One such tool comprises a guide channel having an attaching support, the attaching support adapted to attach the herb collection tool to an herb grinder or an herb container. The herb collection tool can be attached to any suitable herb grinder or herb container. In some cases, a suitable herb grinder is a grinder described herein. In further cases, a suitable herb container is a container described herein. The herb collection tool can connect to an herb container or herb grinder using any suitable mechanism. In some cases, a suitable connection mechanism is a tool locking flange, a tool groove to receive a locking flange, a tool magnet, a tool threaded interface, or a combination thereof. A tool locking flange may comprise a rotational stop. A tool groove may comprise a rotational stop. When a plurality of tool locking flanges or a plurality of tool grooves appear, the plurality may include at least one rotational stop. Certain instances of the present invention provide a connection mechanism that includes a tool locking flange or a tool groove in combination with a tool magnet.

Sometimes, the herb collection tool can be used to funnel ground herb from a herb grinder or a herb container into another vessel along the guide channel. In other cases, the herb collection tool is used as a scooper to shovel ground herb out of the herb grinder or herb container. Certain instances provide a guide channel that terminates in a scraper edge distal from the attaching support.

The herb collection tool also can be used to manipulate the ground herb or other ground material after removal from the herb grinder or herb container. If the guide channel or other portions of the herb collection tool prove inadequate for the desired manipulation, additional features may be present on the tool. For example, one or more picks can be used to pack the ground material in another vessel, such as, for example, a pipe. If more than one pick is present, the several picks can be of different sizes and shapes. In some cases, the picks are conical, terminating in a rounded or flat head. The terminal end can be of any suitable dimension to accomplish the desired manipulation(s). In certain instances, two conical picks of different terminal diameters affixed to the attaching support. A terminal diameter indicates the width of the pick at the tip furthest from the rest of the herb collection tool.

The herb collection tools of the present invention can have any suitable shape and size. In some cases, nonetheless, the attaching support describes an arc of a circle. That arc will help the herb collection tool to attach to circular or partially circular herb grinders and herb containers Herb collection tools can be made of any suitable material. In some cases, a herb collection tool as described herein comprises stainless steel, aluminum, polymer, stone, wood, or a combination of two or more thereof.

DETAILED DESCRIPTION OF THE DRAWINGS

Further embodiments of the present invention can be described by reference to the accompanying drawings.

Figure 2:
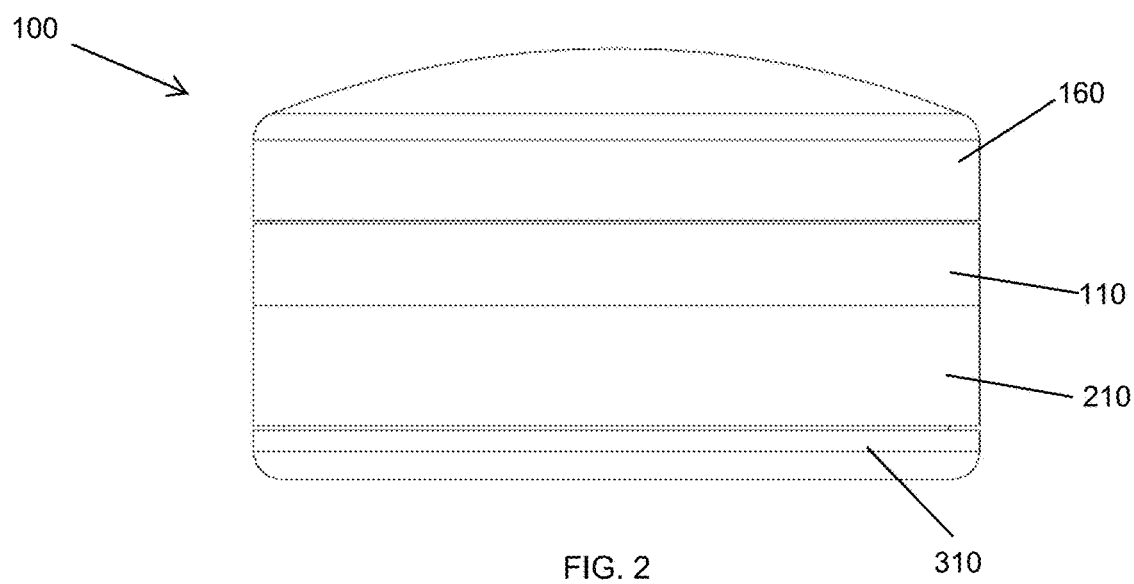
Figure 3:
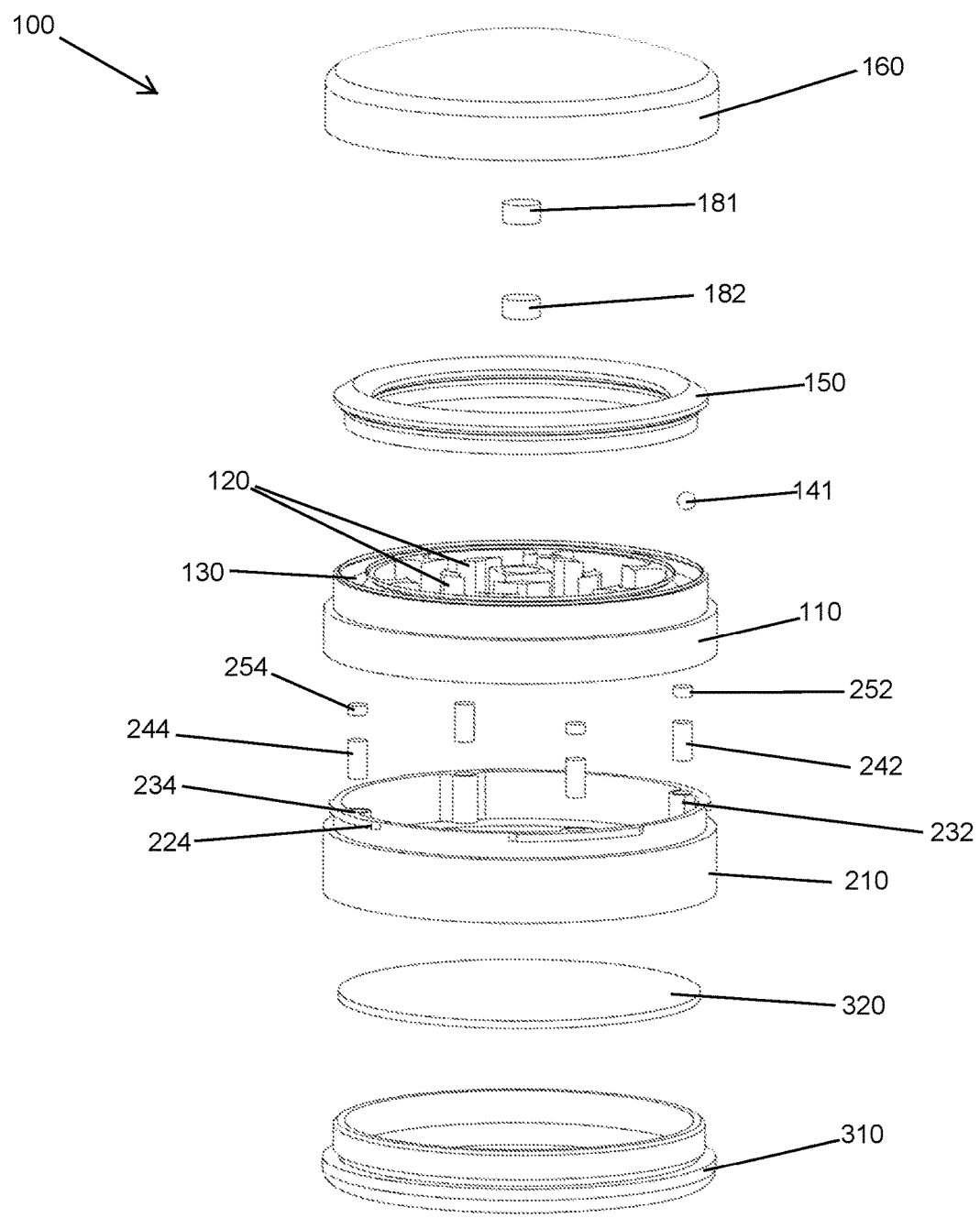
FIG. 3 provides an exploded view of the components of grinder 100.

FIGS. 1-2 depict one embodiment of the invention in a perspective view comprising grinder 100. FIG. 1 is a perspective view, while FIG. 2 is a front elevation view. FIG. 3 provides an exploded view of the components of grinder 100. Grinder 100 comprises base 110 having a first plurality of grinding teeth 120 for grinding a fibrous substance, and lower bearing track 130 encircling the first plurality of grinding teeth 120. Ball bearing 141 represents a plurality of bearing elements disposed in lower bearing track 130. Upper bearing track 150 is in rotational contact with the plurality of bearing elements represented by ball bearing 141. Grinding cap 160 comprises a second plurality of grinding teeth 170 (see FIGS. 6-7) for grinding the fibrous substance. Grinding cap 160 is adapted to contact upper bearing track 150 so that grinding cap 160 can be rotated relative to base 110 wherein lower bearing track 130 the plurality of bearing elements represented by ball bearing 141, and upper bearing track 150 reduce friction between grinding cap 160 and base 110. Grinder 100 also comprises upper magnet 181 and lower magnet 182 disposed between base 110 and grinding cap 160 and adapted to connect grinding cap 160 to base 110 when grinder 100 is not in use.

Grinder 100 further comprises first container 210 adapted to attach to base 110 opposite grinding cap 160. Grinder 100 also comprises locking flange 224 to allow first container 210 to attach to base 110. Grinder 100 further comprises another first connection mechanism chosen from a plurality of container magnets 242, 244, 252, 254. Container magnet 244 fits into container magnet holder 234 and engages container magnet 254 which is disposed in base 110. Container magnet 242 fits into container magnet holder 232 and engages container magnet 252. Screen 320 separates first container 210 from second container 310. Second container 310 attaches to first container 210 via a threaded interface (not shown).

Figure 4:
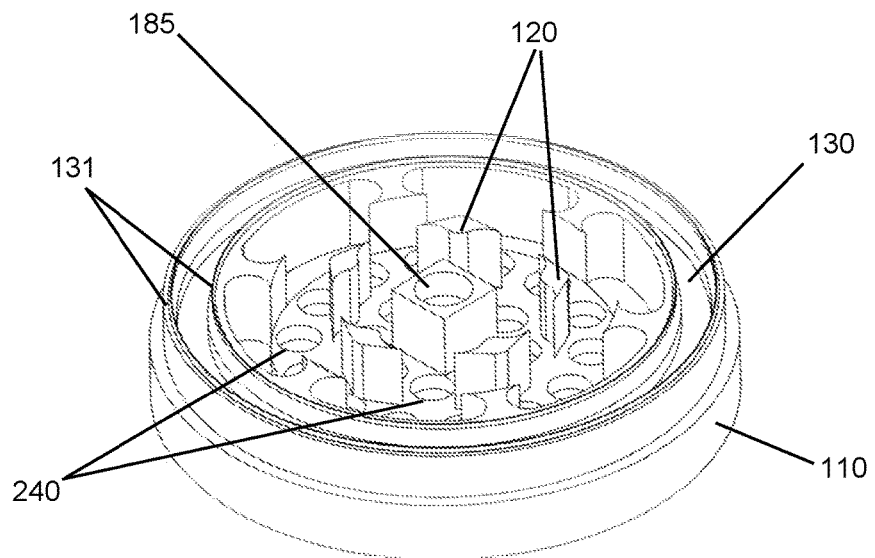
FIGS. 4-5 depict base 110.
Figure 5:
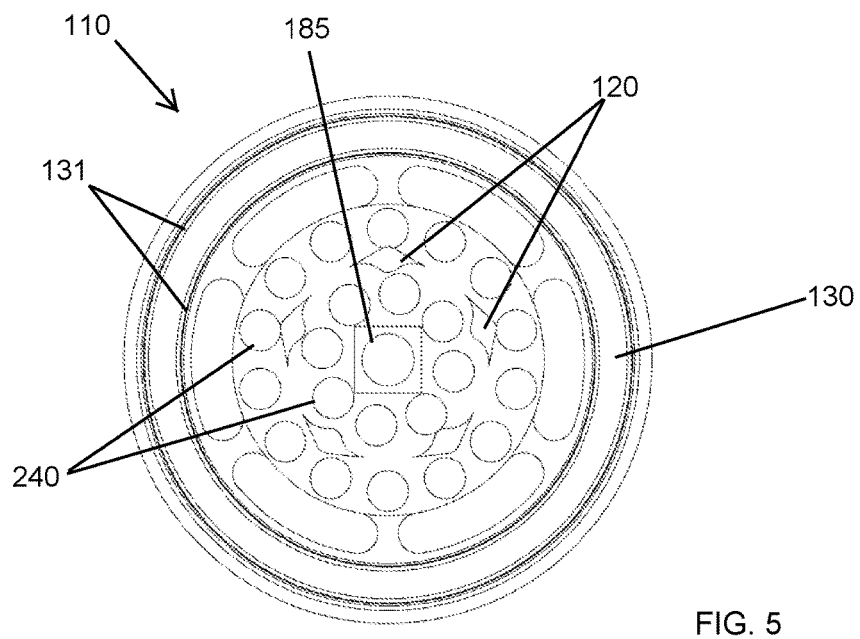

FIGS. 4-5 depict base 110. FIG. 4 is a perspective view, and FIG. 5 is a top plan view. Base 110 has a first plurality of grinding teeth 120 for grinding a fibrous substance, and lower bearing track 130 encircling the first plurality of grinding teeth 120. Lower magnet holder 185 maintains lower magnet 182 (not shown; see FIG. 3). Lower bearing track 130 comprises lower lock structure 131 that allows upper bearing track 150 (not shown; see FIG. 3) remain in rotational contact with a plurality of bearing elements (not shown) disposed in lower bearing track 130. Base 110 comprises a plurality of base openings 240 adapted to allow the fibrous substance to pass through base 110 to first container 210 (not shown) as the fibrous substance is ground.

Figure 6:
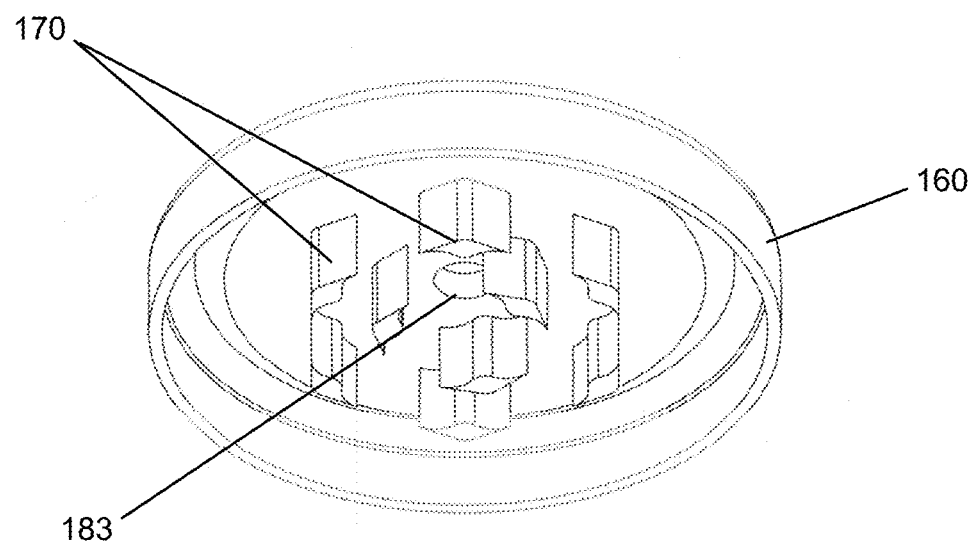
FIGS. 6-7 illustrate grinding cap 160.
Figure 7:
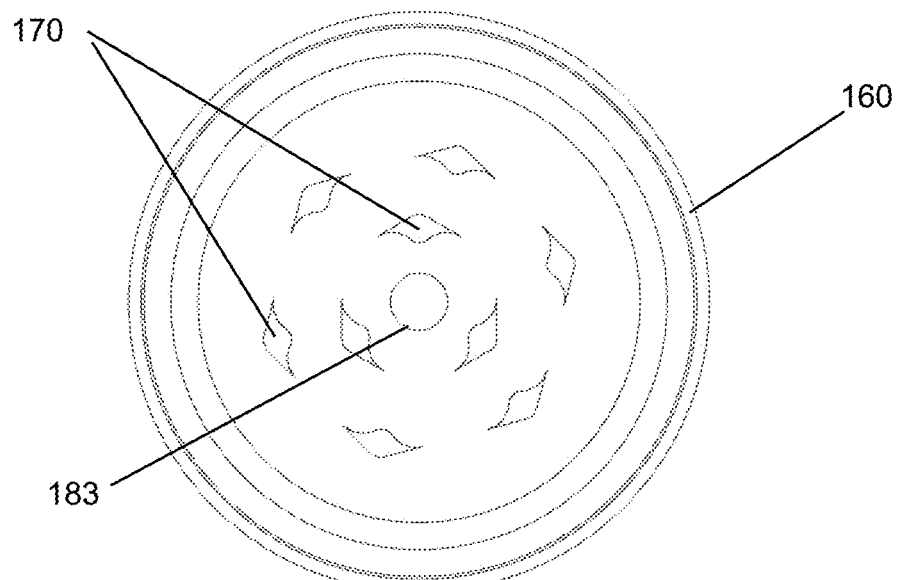

FIGS. 6-7 illustrate grinding cap 160. FIG. 6 is a perspective view, and FIG. 7 provides a bottom plan view. Grinding cap 160 comprises a second plurality of grinding teeth 170 for grinding the fibrous substance. Upper magnet holder 183 receives upper magnet 181 (not shown; see FIG. 3).

Figure 8:
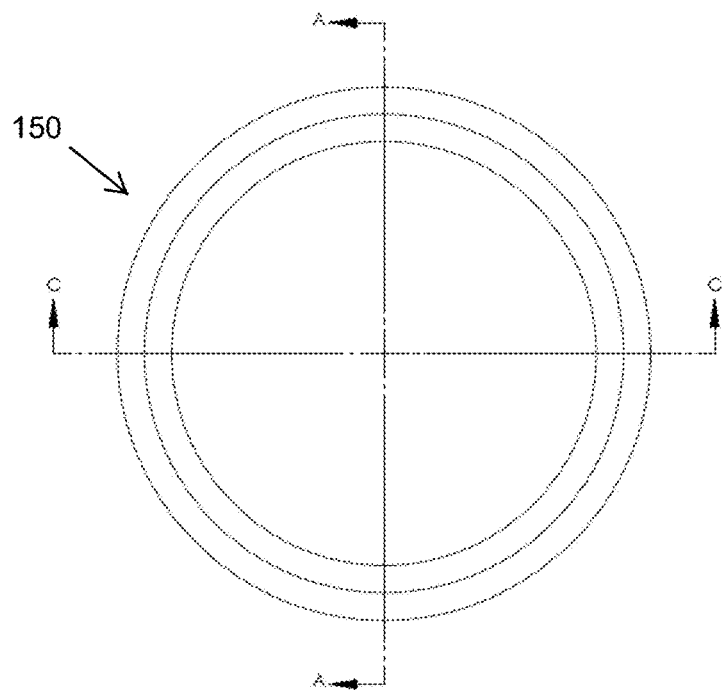
FIGS. 8-11 present upper bearing track 150.
Figure 9:
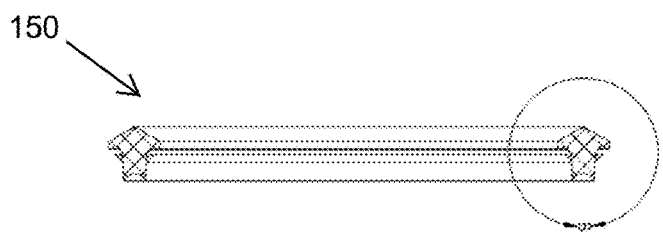
Figure 10:
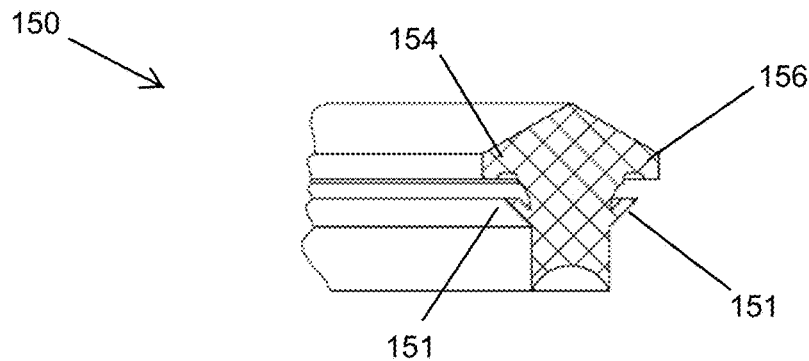
Figure 11:
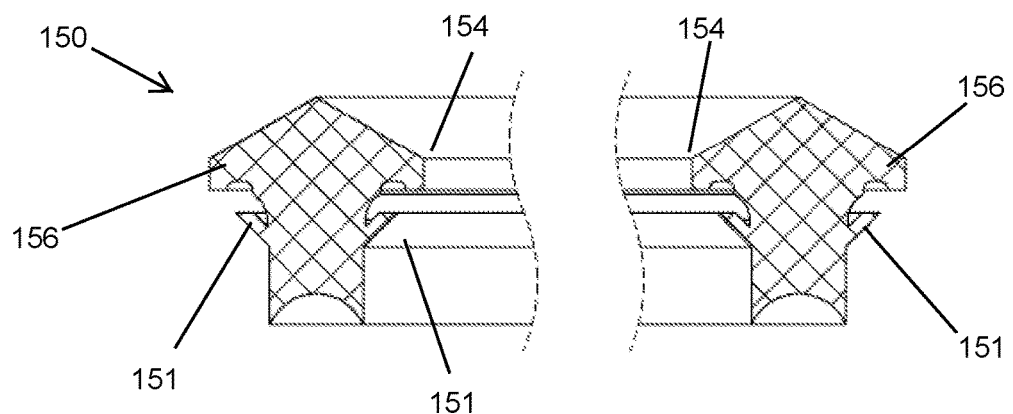

FIGS. 8-11 present upper bearing track 150. FIG. 8 shows a top plan view, while FIG. 9 shows a cutaway side elevation view as seen from line A-A in FIG. 8. FIG. 10 shows a close-up of circle B from FIG. 9. FIG. 11 shows a cutaway front elevation from line C-C in FIG. 8. Upper bearing track 150 comprises inner bearing seal 154 proximal to upper bearing track 150 and adapted to reduce contact between the fibrous substance and the plurality of bearing elements (not shown). Outer bearing seal 156 also appears proximal to the upper bearing track 150, and is adapted to reduce contact between the fibrous substance and the plurality of bearing elements (not shown). Upper bearing track 150 further comprises upper lock structure 151 that engages lower lock structure 131 (not shown; see FIGS. 4-5) to keep upper bearing track 150 in rotational contact with a plurality of bearing elements (not shown) disposed in lower bearing track 130.

Figure 12:
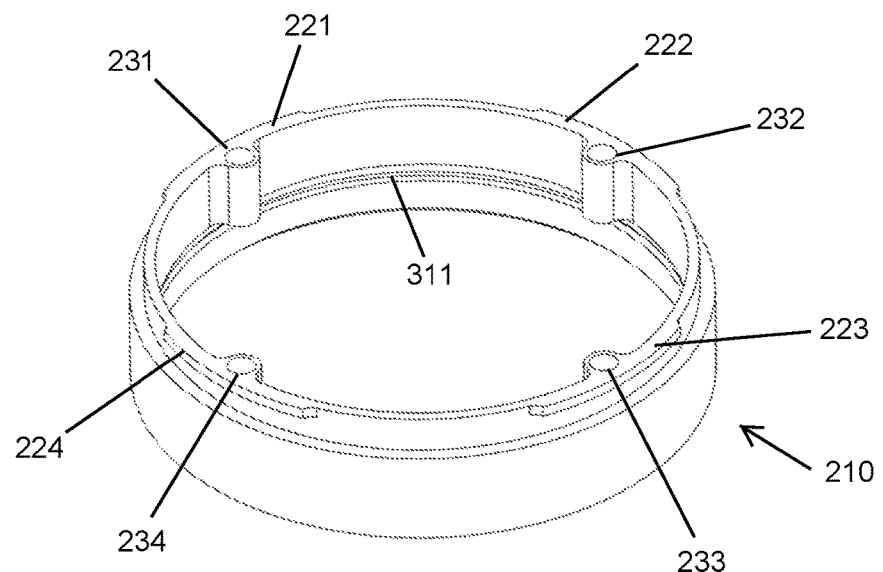
FIGS. 12-14 depict first container 210.
Figure 13:
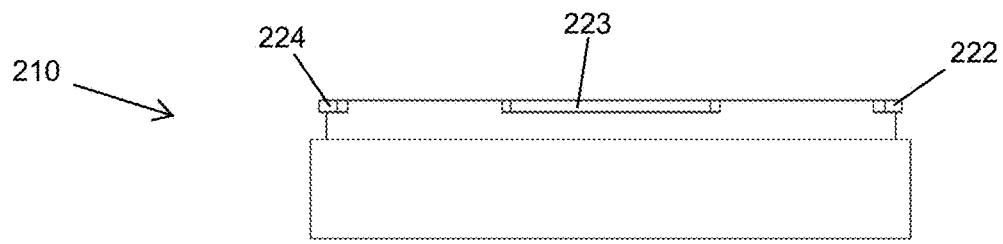
Figure 14:
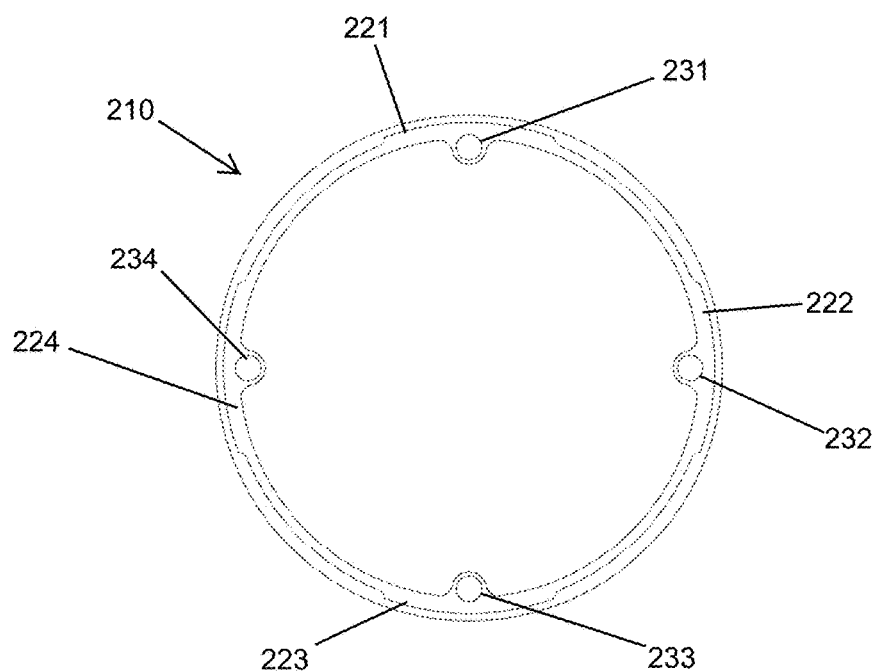
Figure 15:
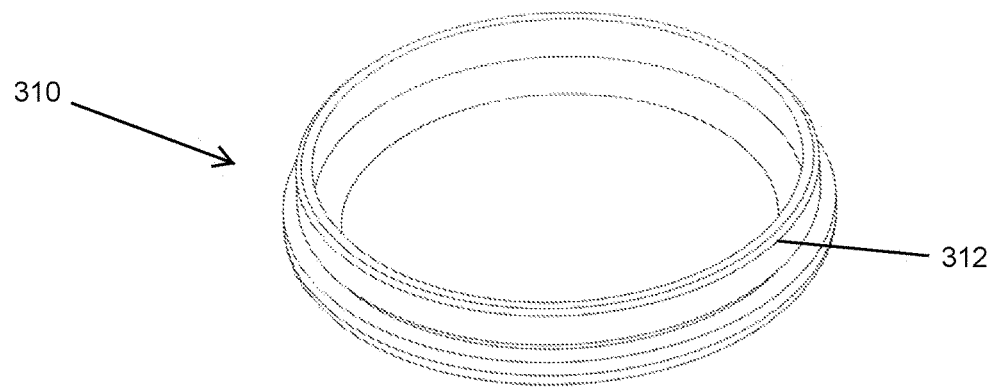
FIGS. 15-17 present second container 310.
Figure 16:
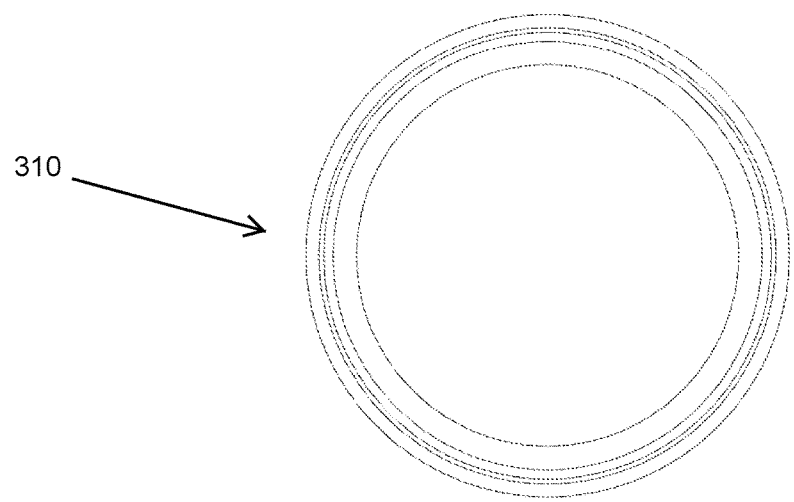
Figure 17:
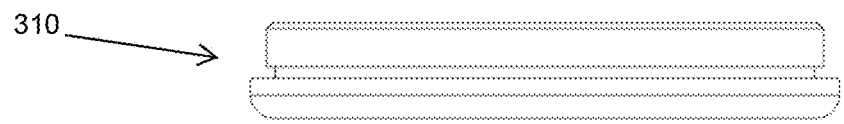
Figure 18:
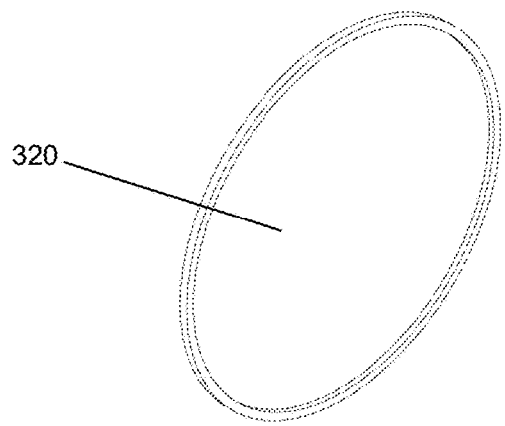
FIGS. 18-19 illustrate screen 320.
Figure 19:
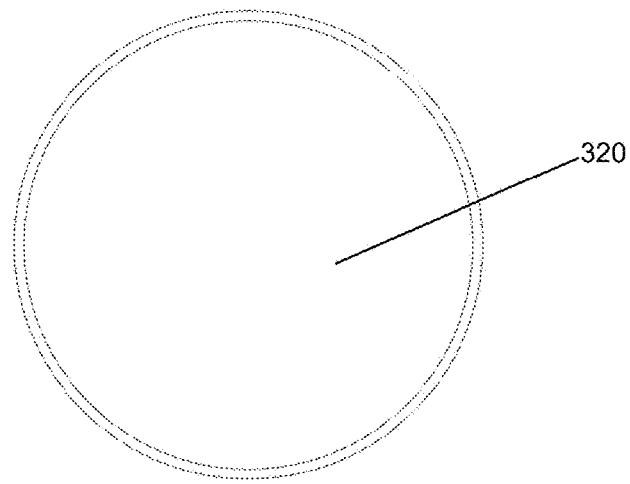
Figure 26:
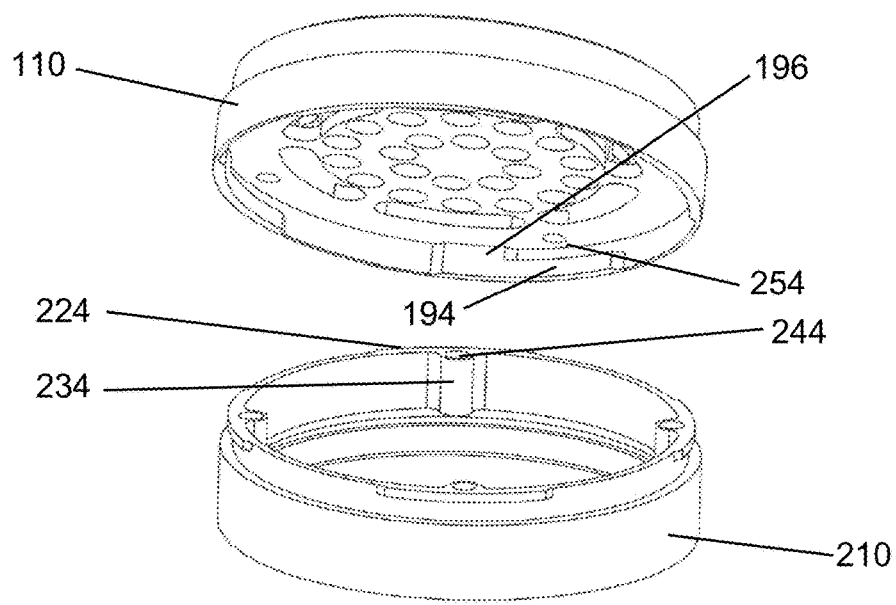
FIG. 26 illustrates the connection between base 110 and the first container 210.

FIGS. 12-14 depict first container 210. FIG. 12 provides a perspective view; FIG. 13 shows a front elevation view; FIG. 14 shows a top plan view. First container 210 connects to base 110 (see also FIG. 26) with locking flanges 221, 222, 223, and 224. Locking flange 224 on first container 210, for example, engages locking flange 194 (FIG. 26) on base 110. Locking flange 194 includes rotational stop 196. Container magnet housings 231, 232, 233, and 234 hold container magnets 241, 242, 243, and 244, respectively. Container magnet 244 fits into container magnet holder 234 and engages container magnet 254 in base 110 when locking flange 224 engages locking flange 194 and encounters rotational stop 196, thereby securing the contents of first container 210. Second container 310 (see FIGS. 15-17) connects to first container 210 via threaded interface 311 (FIG. 12) engaging threaded interface 312 (FIG. 15), which also hold screen 320 (FIGS. 18-19) between second container 310 and first container 210, thereby securing the contents of second container 310. FIGS. 15-17 present second container 310. FIG. 15 provides a perspective view; FIG. 16 shows a top plan view; and FIG. 17 illustrates a front elevation view. FIGS. 18-19 illustrate screen 320. FIG. 18 is a perspective view; FIG. 19 is a top plan view.

Figure 20:
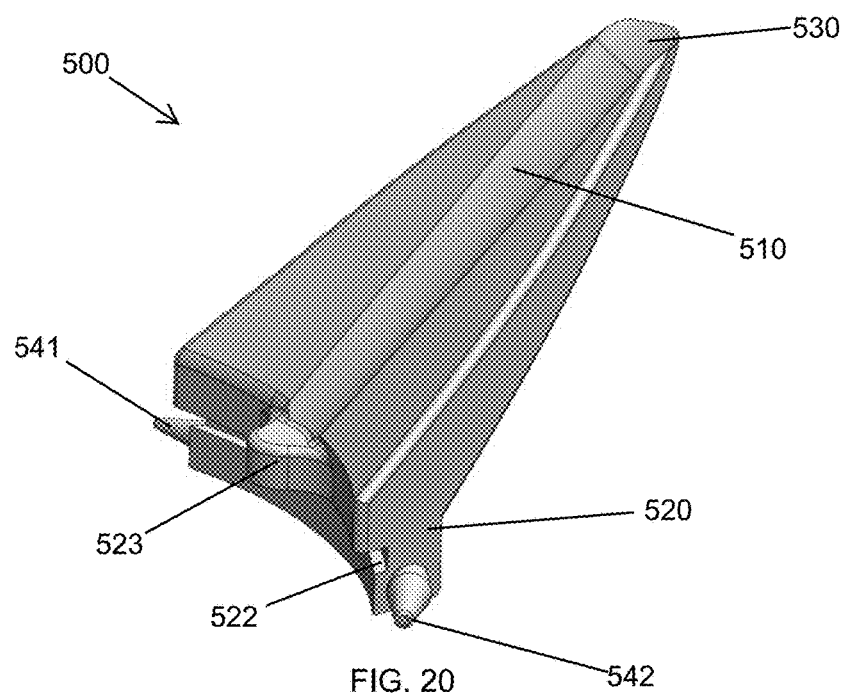
FIGS. 20-25 depict herb collection tool 500.
Figure 21:
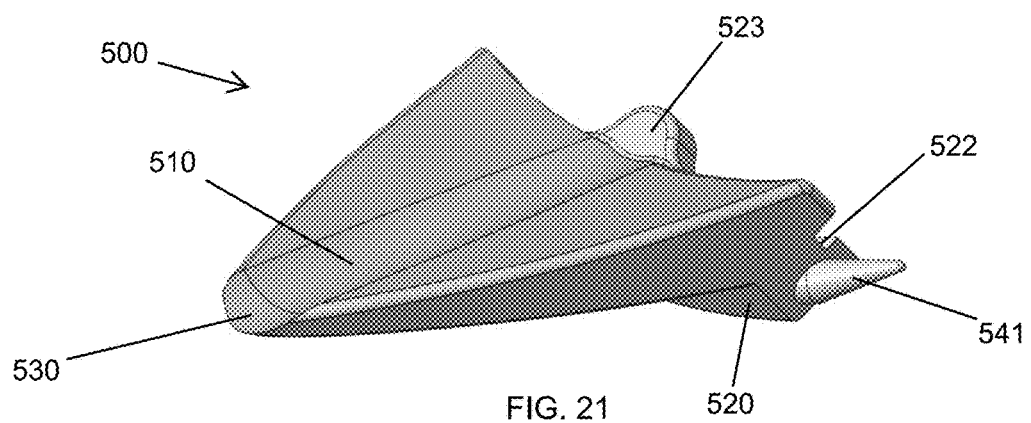
Figure 22:
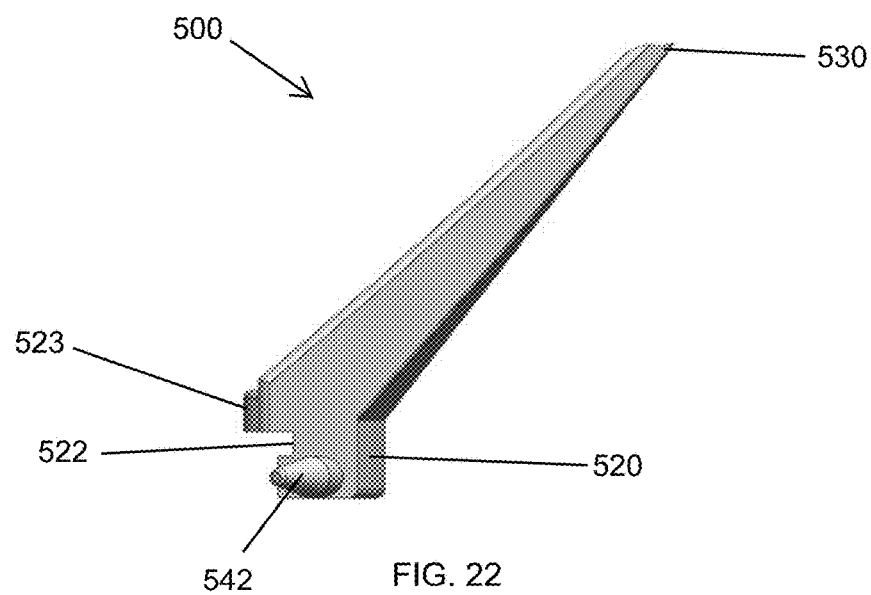
Figure 23:
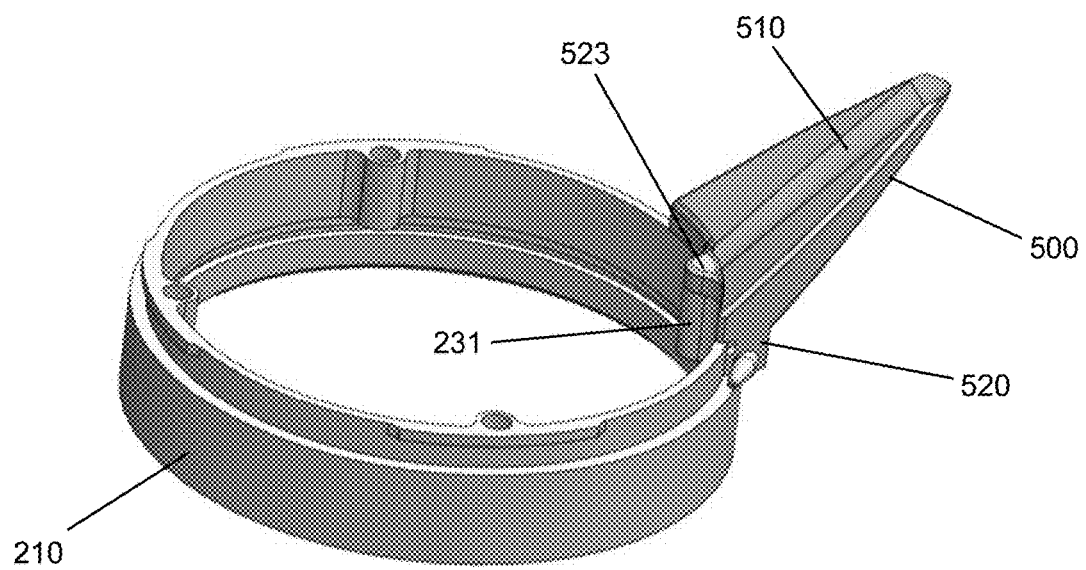
Figure 24:
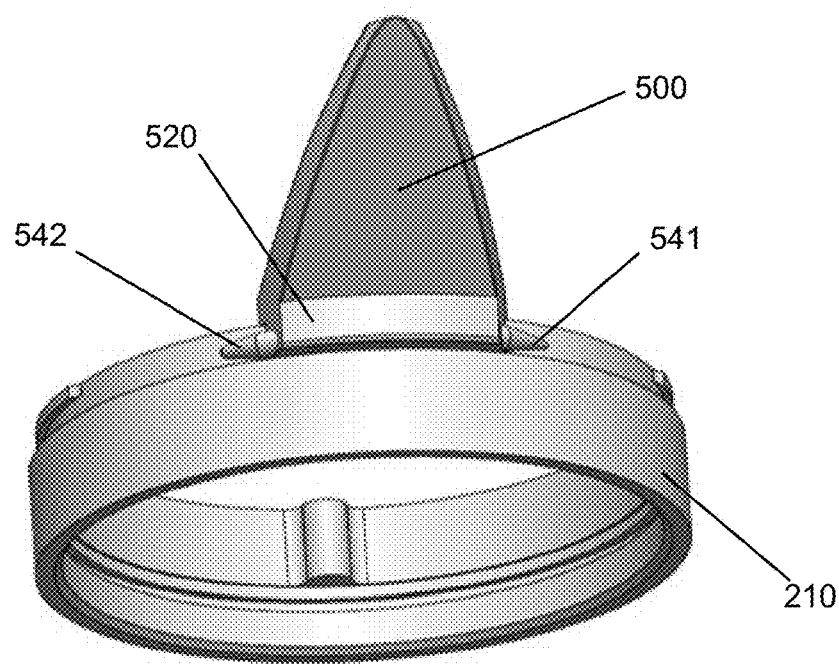
Figure 25:
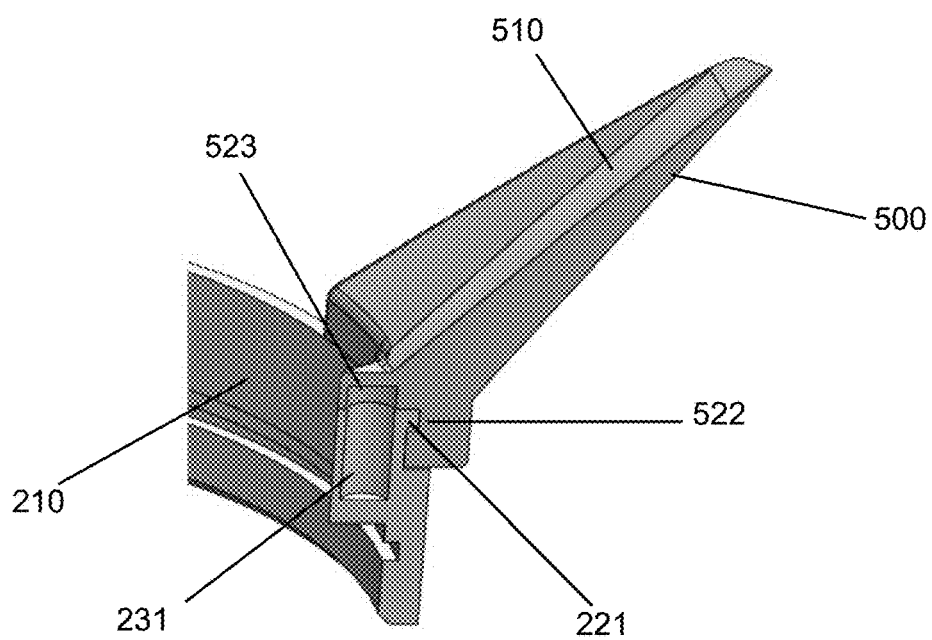

FIGS. 20-25 depict herb collection tool 500. FIGS. 23-24 add first container 210. FIG. 25 shows herb collection tool 500 attached to first container 210 in a cutaway view. FIG. 20 shows a right-side perspective view, while FIG. 21 shows a left-side perspective view. FIG. 22 shows a right-side elevation. FIGS. 23-25 show how the herb collection tool can attach to first container 210. Herb collection tool 500 comprises guide channel 510 having an attaching support 520 adapted to attach herb collection tool 500 to herb grinder 100 or first container 210. Attaching support 520 includes a connection mechanism in the form of tool groove 522 and a tool magnet (not seen) disposed in tool magnet housing 523. Guide channel 510 terminates in scraper edge 530 distal from attaching support 520. Herb collection tool 500 includes conical picks 541, 542 affixed to attaching support 520. Conical pick 541 has a smaller terminal diameter than conical pick 542; in other words, conical pick 541 is smaller, sharper, or "pointier" than conical pick 542. Attaching support 520 describes an arc of a circle, as can be seen in FIGS. 23-25. Tool groove 522 engages locking flange 221 (see, e.g., FIG. 25) of first container 210. The container magnet (not shown) that resides in container magnet housing 231 engages the tool magnet (not shown) that resides in tool magnet housing 523 when the herb collection tool 500 and first container 210 are at the "locked" position relative to each other. Scraper edge 530 can be used to scrape up ground fibrous material, and conical picks 541, 542 can be used to pack the ground fibrous material as desired.

Figure 27:
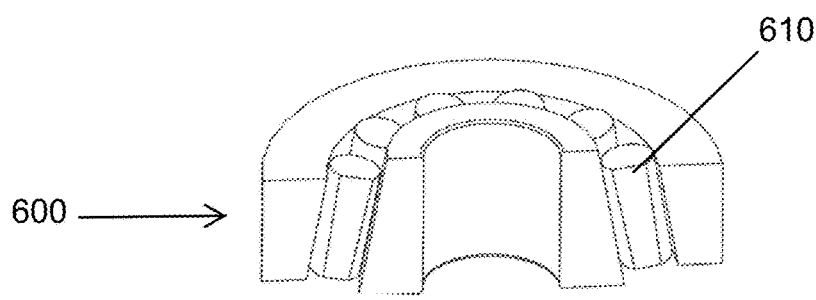
FIG. 27 depicts bearing race 600 with cylindrical bearing 610.
Figure 28:
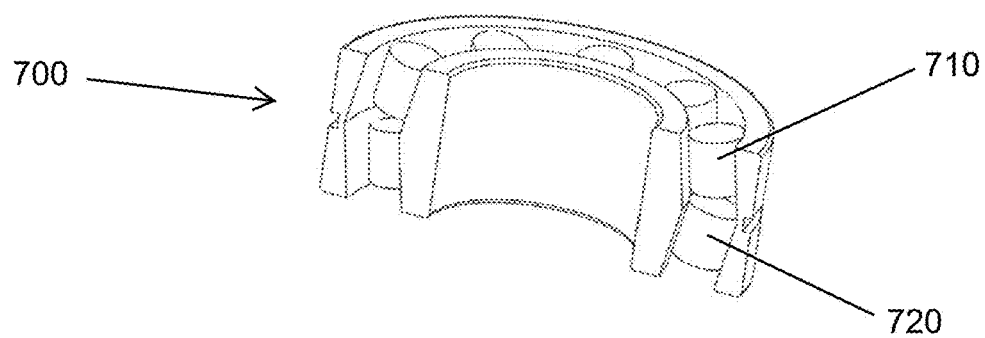
FIG. 28 illustrates bearing race 700 with cylindrical bearings 710, 720.
Figure 29:
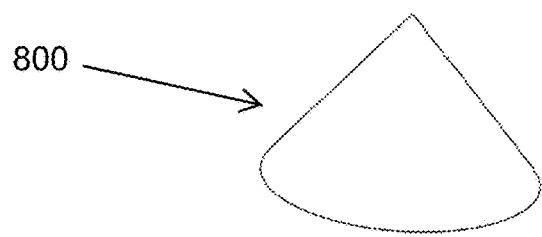
FIG. 29 depicts conical bearing 800.
Figure 30:
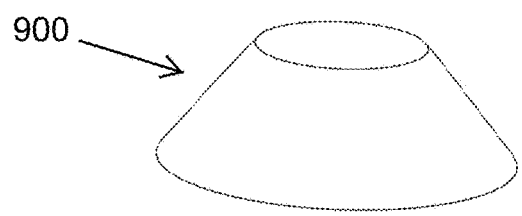
FIG. 30 depicts truncated conical bearing 900.

Any suitable bearing elements in any suitable configuration can be employed in the various embodiments of the present invention. FIG. 27 depicts bearing race 600 with cylindrical bearing 610. FIG. 28 illustrates bearing race 700 with cylindrical bearings 710, 720. FIG. 29 depicts conical bearing 800. FIG. 30 depicts truncated conical bearing 900.

EMBODIMENTS

Embodiment 1

A grinder, comprising:
a base having a first plurality of grinding teeth for grinding a fibrous substance, and a lower bearing track encircling the first plurality of grinding teeth;
a plurality of bearing elements disposed in the lower bearing track;
an upper bearing track in rotational contact with the plurality of bearing elements; and
a grinding cap comprising a second plurality of grinding teeth for grinding the fibrous substance, the grinding cap being adapted to contact the upper bearing track so that the grinding cap can be rotated relative to the base wherein the lower bearing track, the plurality of bearing elements, and the upper bearing track reduce friction between the grinding cap and the base.

Embodiment 2

The grinder of embodiment 1, further comprising an inner bearing seal proximal to the upper bearing track and adapted to reduce contact between the fibrous substance and the plurality of bearing elements.

Embodiment 3

The grinder of any one of the preceding embodiments, further comprising an outer bearing seal proximal to the upper bearing track and adapted to reduce contact between the fibrous substance and the plurality of bearing elements.

Embodiment 4

The grinder of any one of the preceding embodiments, wherein the plurality of bearing elements comprises ball bearings, right cylindrical bearings, conical bearings, truncated conical bearings, or a combination of two or more thereof.

Embodiment 5

The grinder of any one of the preceding embodiments, wherein
the upper bearing track comprises an upper lock structure; and
the lower bearing track comprises a lower lock structure; wherein
the upper lock structure engages the lower lock structure to keep the upper bearing track in rotational contact with the plurality of bearing elements disposed in the lower bearing track.

Embodiment 6

The grinder of any one of the preceding embodiments, further comprising at least one magnet disposed between the base and the grinding cap, the magnet adapted to connect the grinding cap to the base when the grinder is not in use.

Embodiment 7

The grinder of any one of the preceding embodiments, further comprising a first container adapted to attach to the base opposite the grinding cap.

Embodiment 8

The grinder of embodiment 7, wherein the base comprises a plurality of base openings adapted to allow the fibrous substance to pass through the base to the first container as the fibrous substance is ground.

Embodiment 9

The grinder of any one of embodiments 7-8, wherein the first container is adapted to attach to the base with at least one first connection mechanism chosen from a locking flange, a groove to receive a locking flange, a container magnet, and a threaded interface, and combinations thereof.

Embodiment 10

The grinder of embodiment 9, wherein the locking flange, the groove, or both comprises a rotational stop.

Embodiment 11

The grinder of embodiment 9, wherein the at least one first connection mechanism comprises a plurality of locking flanges.

Embodiment 12

The grinder of embodiment 11, wherein the plurality of locking flanges comprises at least one rotational stop.

Embodiment 13

The grinder of any one of embodiments 9-12, wherein the at least one first connection mechanism comprises a plurality of container magnets.

Embodiment 14

The grinder of any one of embodiments 7-14, further comprising a second container adapted to attach to the first container opposite the base.

Embodiment 15

The grinder of embodiment 14, comprising a mesh screen disposed between the first container and the second container.

Embodiment 16

The grinder of any one of embodiments 14-16, wherein the second container is adapted to attach to the first container with at least one second connection mechanism chosen from a locking flange, a groove to receive a locking flange, a container magnet, and a threaded interface, and combinations thereof.

Embodiment 17

The grinder of embodiment 16, wherein the at least one second connection mechanism comprises a threaded interface.

Embodiment 18

The grinder of any one of the preceding embodiments, comprising stainless steel, aluminum, polymer, stone, wood, or a combination of two or more thereof.

Embodiment 19

A method of grinding a fibrous substance, comprising:
obtaining the grinder of any one of the preceding embodiments;
placing the fibrous substance between the first plurality of grinding teeth and the second plurality of grinding teeth;
rotating the grinding cap relative to the base, thereby causing the first plurality of grinding teeth and the second plurality of grinding teeth to grind the fibrous substance.

Embodiment 20

A method of manufacturing the grinder of any one of the preceding embodiments, comprising:
- obtaining the base having the first plurality of grinding teeth and the lower bearing track encircling the first plurality of grinding teeth;
- disposing the plurality of bearing elements in the lower bearing track; placing the upper bearing track in rotational contact with the plurality of bearing elements; and
- obtaining the grinding cap comprising the second plurality of grinding teeth; thereby forming the grinder.

Embodiment 21

A container, comprising:
- a bottom comprising a first plurality of container magnets;
- a top comprising a second plurality of container magnets;
- wherein the first plurality of container magnets and second plurality of container magnets align when the bottom is in a closed position relative to the top.

Embodiment 22

The container of embodiment 21, further comprising a locking flange that locks when the bottom is in the closed position relative to the top.

Embodiment 23

The container of embodiment 21, further comprising a plurality of locking flanges disposed on the bottom, and a plurality of grooves on the top adapted to receive the plurality of locking flanges.

Embodiment 24

The container of embodiment 21, further comprising a plurality of locking flanges disposed on the top, and a plurality of grooves on the bottom adapted to receive the plurality of locking flanges.

Embodiment 25

The container of embodiment 21, wherein the container comprises
- one or more first locking flanges disposed on the top and one or more first grooves disposed on the bottom and adapted to receive the one or more first locking flanges;
- one or more second locking flanges disposed on the bottom and one or more second grooves disposed on the top and adapted to receive the one or more second locking flanges.

Embodiment 26

A grinder, comprising:
- a base having a first plurality of grinding teeth for grinding a fibrous substance, and a lower bearing track encircling the first plurality of grinding teeth;
- an upper bearing track;
- a plurality of bearing elements disposed in the upper bearing track, wherein the upper bearing track and the plurality of bearing elements are disposed in rotational contact with the lower bearing track;
- a grinding cap comprising a second plurality of grinding teeth for grinding the fibrous substance, the grinding cap being adapted to contact the upper bearing track so that the grinding cap can be rotated relative to the base wherein the lower bearing track, the plurality of bearing elements, and the upper bearing track reduce friction between the grinding cap and the base.

Embodiment 27

A method of reducing rotational friction between a first surface and a second surface that rotate against each other in a contaminating environment, comprising:
- interposing a bearing race between the first surface and the second surface, wherein the bearing race comprises a plurality of bearing elements in rotational contact with a first bearing track and a second bearing track, and wherein the first bearing track and second bearing track shield the plurality of bearing elements from contamination from the contaminating environment, thereby reducing rotational friction between the first surface and the second surface.

Embodiment 28

The method of embodiment 27, wherein the first bearing track is affixed to the first surface.

Embodiment 29

The method of any one of embodiments 27-28, wherein the second bearing track is affixed to the second surface.

Embodiment 30

A method of sealing a bearing race comprising:
- providing a bearing race having a first bearing track, a second bearing track, and a plurality of bearing elements between the first bearing track and the second bearing track;
- establishing an inner bearing seal and an outer bearing seal on the first bearing track to seal the plurality of bearing elements.

Embodiment 31

An herb collection tool, comprising:
- a guide channel having an attaching support, the attaching support adapted to attach the herb collection tool to an herb grinder or an herb container.

Embodiment 32

The herb collection tool of embodiment 31, wherein the herb grinder is the grinder set forth in any one of embodiments 1-18 and 26.

Embodiment 33

The herb collection tool of any one of embodiments 31-32, wherein the herb container is the container of any one of embodiments 21-25.

Embodiment 34

The herb collection tool of any one of embodiments 31-33, wherein the attaching support comprises at least one second connection mechanism.

Embodiment 35

The herb collection tool of embodiment 34, wherein the at least one second connection mechanism is a tool locking flange, a tool groove to receive a locking flange, a tool magnet, a tool threaded interface, or a combination thereof.

Embodiment 36

The herb collection tool of embodiment 35, wherein the tool locking flange comprises a rotational stop.

Embodiment 37

The herb collection tool of embodiment 34, wherein the at least one second connection mechanism comprises a plurality of tool locking flanges.

Embodiment 38

The herb collection tool of embodiment 37, wherein the plurality of tool locking flanges comprises at least one rotational stop.

Embodiment 39

The herb collection tool of embodiment 34, wherein the at least one second connection mechanism comprises a tool groove to receive a locking flange and a tool magnet.

Embodiment 40

The herb collection tool of any one of embodiments 31-39, wherein the guide channel terminates in a scraper edge distal from the attaching support.

Embodiment 41

The herb collection tool of any one of embodiments 31-40, further comprising one or more picks.

Embodiment 42

The herb collection tool of embodiment 41, wherein the one or more picks comprises two conical picks of different terminal diameters affixed to the attaching support.

Embodiment 43

The herb collection tool of any one of embodiments 31-42, wherein the attaching support describes an arc of a circle.

Embodiment 44

The herb collection tool of any one of embodiments 31-43, comprising stainless steel, aluminum, polymer, stone, wood, or a combination of two or more thereof.

As previously stated, detailed embodiments of the present invention are disclosed herein; however, it is to be understood that the disclosed embodiments are merely exemplary of the invention that may be embodied in various forms. It will be appreciated that many modifications and other variations stand within the intended scope of this invention as claimed below. Furthermore, the foregoing description of various embodiments does not necessarily imply exclusion. For example, "some" embodiments may include all or part of "other" and "further" embodiments within the scope of this invention. In addition, "a" does not mean "one and only one;" "a" can mean "one and more than one."

I claim:

1. A grinder, comprising:
    a base having a first plurality of grinding teeth for grinding a fibrous substance, and a lower bearing track encircling the first plurality of grinding teeth;
    a plurality of ball bearings disposed in the lower bearing track; each ball bearing in the plurality of ball bearings consisting essentially of ceramic, polymer, or a combination thereof, and the plurality of ball bearings being without any lubricant;
    an upper bearing track in rotational contact with the plurality of ball bearings, the upper bearing track comprising an inner bearing seal and an outer bearing seal both adapted to reduce contact between the fibrous substance and the plurality of ball bearings; and
    a grinding cap comprising a second plurality of grinding teeth for grinding the fibrous substance, the grinding cap being adapted to contact the upper bearing track so that the grinding cap can be rotated relative to the base wherein the lower bearing track, the plurality of ball bearings, and the upper bearing track reduce friction between the grinding cap and the base;
        wherein the grinding cap and the base define a gap between them, when the grinding cap is contacting the upper bearing track.

2. The grinder of claim 1, wherein the upper bearing track comprises an upper lock structure; and the lower bearing track comprises a lower lock structure; wherein the upper lock structure engages the lower lock structure to keep the upper bearing track in rotational contact with the plurality of ball bearings disposed in the lower bearing track.

3. The grinder of claim 1, further comprising at least one magnet disposed between the base and the grinding cap, the magnet adapted to connect the grinding cap to the base when the grinder is not in use.

4. The grinder of claim 1, further comprising a first container adapted to attach to the base opposite the grinding cap.

5. The grinder of claim 4, wherein the base comprises a plurality of base openings adapted to allow the fibrous substance to pass through the base to the first container as the fibrous substance is ground.

6. The grinder of claim 4, wherein the first container is adapted to attach to the base with at least one first connection mechanism chosen from a first locking flange, a first groove to receive a second locking flange, a first container magnet, and a first threaded interface, and combinations thereof.

7. The grinder of claim 6, wherein the locking flange comprises a rotational stop.

8. The grinder of claim 6, wherein the at least one first connection mechanism comprises a plurality of locking flanges.

9. The grinder of claim 8, wherein the plurality of locking flanges comprises at least one rotational stop.

10. The grinder of claim 6, wherein the at least one first connection mechanism comprises a plurality of container magnets.

11. The grinder of claim 4, further comprising a second container adapted to attach to the first container opposite the base.

12. The grinder of claim 11, comprising a mesh screen disposed between the first container and the second container.

13. The grinder of claim 11, wherein the second container is adapted to attach to the first container with at least one second connection mechanism chosen from a third locking flange, a second groove to receive a fourth locking flange, a second container magnet, and a second threaded interface, and combinations thereof.

14. The grinder of claim 13, wherein the at least one second connection mechanism comprises the second threaded interface.

15. The grinder of claim 1, comprising stainless steel, aluminum, polymer, stone, wood, or a combination of two or more thereof.

16. The grinder of claim 1, wherein each ball bearing in the plurality of ball bearings is ceramic.

17. The grinder of claim 1, wherein each ball bearing in the plurality of ball bearings is polymer.

* * * * *